US010777913B2

(12) United States Patent
Evans et al.

(10) Patent No.: US 10,777,913 B2
(45) Date of Patent: Sep. 15, 2020

(54) LEAF SPRING COMPRESSION SYSTEM DESIGN

(71) Applicant: ESS TECH, INC, Portland, OR (US)

(72) Inventors: Craig E. Evans, West Linn, OR (US); Sean Casey, Portland, OR (US)

(73) Assignee: ESS TECH, INC., Portland, OR (US)

( * ) Notice: Subject to any disclaimer, the term of this patent is extended or adjusted under 35 U.S.C. 154(b) by 122 days.

(21) Appl. No.: 15/891,277

(22) Filed: Feb. 7, 2018

(65) Prior Publication Data

US 2018/0233834 A1    Aug. 16, 2018

Related U.S. Application Data

(60) Provisional application No. 62/458,446, filed on Feb. 13, 2017.

(51) Int. Cl.
| | | |
|---|---|---|
| *H01M 10/04* | (2006.01) | |
| *H01M 2/20* | (2006.01) | |
| *H01M 8/0258* | (2016.01) | |
| *H01M 8/248* | (2016.01) | |
| *H01M 8/2485* | (2016.01) | |
| *H01R 4/48* | (2006.01) | |
| *H01M 8/18* | (2006.01) | |

(52) U.S. Cl.
CPC .......... *H01R 4/4809* (2013.01); *H01M 2/208* (2013.01); *H01M 8/0258* (2013.01); *H01M 8/188* (2013.01); *H01M 8/248* (2013.01); *H01M 8/2485* (2013.01); *H01M 10/0468* (2013.01); *H01M 8/18* (2013.01); *H01R 4/489* (2013.01); *Y02E 60/528* (2013.01)

(58) Field of Classification Search
None
See application file for complete search history.

(56) References Cited

U.S. PATENT DOCUMENTS

| 4,998,349 A | 3/1991 | Killeen | |
|---|---|---|---|
| 5,337,036 A * | 8/1994 | Kuczynski | ......... H01H 37/5427 |
| | | | 337/343 |

(Continued)

FOREIGN PATENT DOCUMENTS

| CN | 203553236 U | 4/2014 |
|---|---|---|
| JP | 2015149238 A | 8/2015 |
| WO | 2015142349 A1 | 9/2015 |

OTHER PUBLICATIONS

ISA Korean Intellectual Property Office, International Search Report and Written Opinion Issued in Application No. PCT/US2018/017293, dated May 23, 2018, WIPO, 12 pages.

*Primary Examiner* — Zhongqing Wei
(74) *Attorney, Agent, or Firm* — McCoy Russell LLP

(57) ABSTRACT

A leaf spring compression system comprising a mechanical assembly for securing a plurality of leaf springs on a battery cell stack of a flow battery system is disclosed. The cell stack may, comprise: a plurality of cells stacked together to form a flow battery; and a compression system comprising at least two tie rods extending through the plurality of cells clamping a spring acting at opposite ends to compress the cells together, the spring contacting at least two fulcrum elements positioned between the tie rods. In this way, the compression system may exert uniform loading on the battery cell stack, while minimizing deflection of pressure plates attached to the cell stack.

20 Claims, 9 Drawing Sheets

(56) References Cited

U.S. PATENT DOCUMENTS

| | | |
|---|---|---|
| 6,372,372 B1 | 4/2002 | D'Aleo et al. |
| 9,017,869 B2 | 4/2015 | Nakaishi et al. |
| 2006/0188771 A1* | 8/2006 | Allen .................... H01M 8/248 |
| | | 429/433 |

* cited by examiner

LEAF SPRING COMPRESSION SYSTEM DESIGN

CROSS REFERENCE TO RELATED APPLICATION

This application claims priority to U.S. Provisional Patent Application No. 62/458,446, entitled "Leaf Spring Compression System Design," filed Feb. 13, 2017, the entire contents of which is hereby incorporated by reference in its entirety for all purposes.

FIELD

The present description relates generally to methods and systems for a leaf spring compression system for securing a battery cell stack of a flow battery system.

BACKGROUND AND SUMMARY

A reduction-oxidation (redox) flow battery is an electrochemical device which converts chemical energy stored in a battery to electrical energy via reverse redox reactions. When depleted, the chemical energy in the battery is restored by applying an electrical current to induce reverse redox reactions.

In general, the redox flow battery includes negative and positive electrodes contained within a battery cell stack. These electrodes take part in electrochemical reactions responsible for storing and releasing chemical energy in the battery, and thus affect battery performance and overall costs. In practice, a plurality of battery cells are stacked together in electrical series to produce a desired voltage or power level. Perimeter spacers may be placed in between stacked cells to provide a cushion between battery cells while permitting electrical connectivity of the cell stacks. Each stack of cells is compressed between two rigid endplates using a compression system that aims to provide an adequate force to seal the cell stack and compress an active area of the battery cell stack, without overly stressing components. The compression system also tries to accommodate changes in stack height caused by thermal expansion and contraction of the cell stack during operation, although these objectives may compromise the balance of sufficient but not excessive compressive force.

One example compression system is presented by Blanchet in U.S. Pat. No. 6,413,665. The system comprises spring and linkage mechanical assemblies used in conjunction with tie rods and bars to compress a fuel cell stack. The linkage mechanism contains a lever and pins to transfer a compression load imposed by the spring assembly through the tie rods and bars (attached to an end plate strapped at the bottom of the cell stack) to the fuel cell stack. Further, the spring assembly contains a plurality of springs configured to provide a decreasing load profile as the fuel cell stack is compressed by cell consolidation. Other cell stack compression systems may include large coil springs attached to an end plate strapped around a battery cell stack of a flow battery. The coil springs are designed to transfer a compression load from a link mechanism to the battery cell stack.

However, the inventors have recognized potential issues with such compression system for cell stacks. For example, compression loads imposed only at one end of the cell stack may generate asymmetric loading of the cell stack and may generate structural degradation prematurely. Further, issues related to the compressive loads and expansion, as well as the interactions therebetween, can be particular to flow battery systems.

As another example, coil springs designed to provide loading at the base of the springs and around the periphery of the cell stack may generate non-uniform loading of the cell stack, inducing deflections larger than permitted. Overly large deflections may cause unstable conditions within the battery cell stack affecting performance of the flow battery.

The inventors herein have recognized the above issues and developed various battery cell stack compression systems. In one example, a compression system comprising a tie rod assembly may be used in conjunction with reinforcement bars, a plurality of springs, such as leaf springs, and fulcrums to apply a compression load on pressure plates attached to a battery cell stack of a flow battery. The tie rod assembly may be adjustable to produce a desirable compression load which may be transferred through the leaf springs to the battery cell stack. A pair of fulcrums positioned behind each leaf spring may be configured to redirect the compression load exerted by the tie rod assembly to an active area of the cell stack to maintain uniform loading on the cell stack. By redirecting the compressive load imposed on the cell stack, the compression system may reduce non-uniform loading of battery cell stack while keeping deflections in the cell stack system to threshold levels.

The approach described here may confer several advantages. For example, the compression system may be designed to provide uniform loading on the battery cell stack under a wide range of operating conditions. Further, the compression system can be adjusted to allow for expansion and contraction of the cell stack during operation while keeping deflection of the cell stack system within allowable levels and minimizing overall costs.

The above discussion includes recognitions made by the inventors and not admitted to be generally known. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for a spring compression system comprising a tie rod assembly system for securing a plurality of springs, such as leaf springs, on a battery cell stack of a flow battery system. The spring system may be configured to produce uniform loading on the battery cell stack, minimizing deflection of a pressure plate attached to the cell stack and improving performance of the flow battery while reducing overall costs. In one example structural configuration, a plurality of leaf springs may be coupled to top, center and bottom of a pressure plate secured to one side or both sides of a cell stack using a plurality of tie rod assemblies. A pair of fulcrums may be placed behind each leaf spring to redirect a compression load from a pair of tie rod assemblies to an active area of the cell stack while minimizing deflection of the cell stack.

Figure 1:
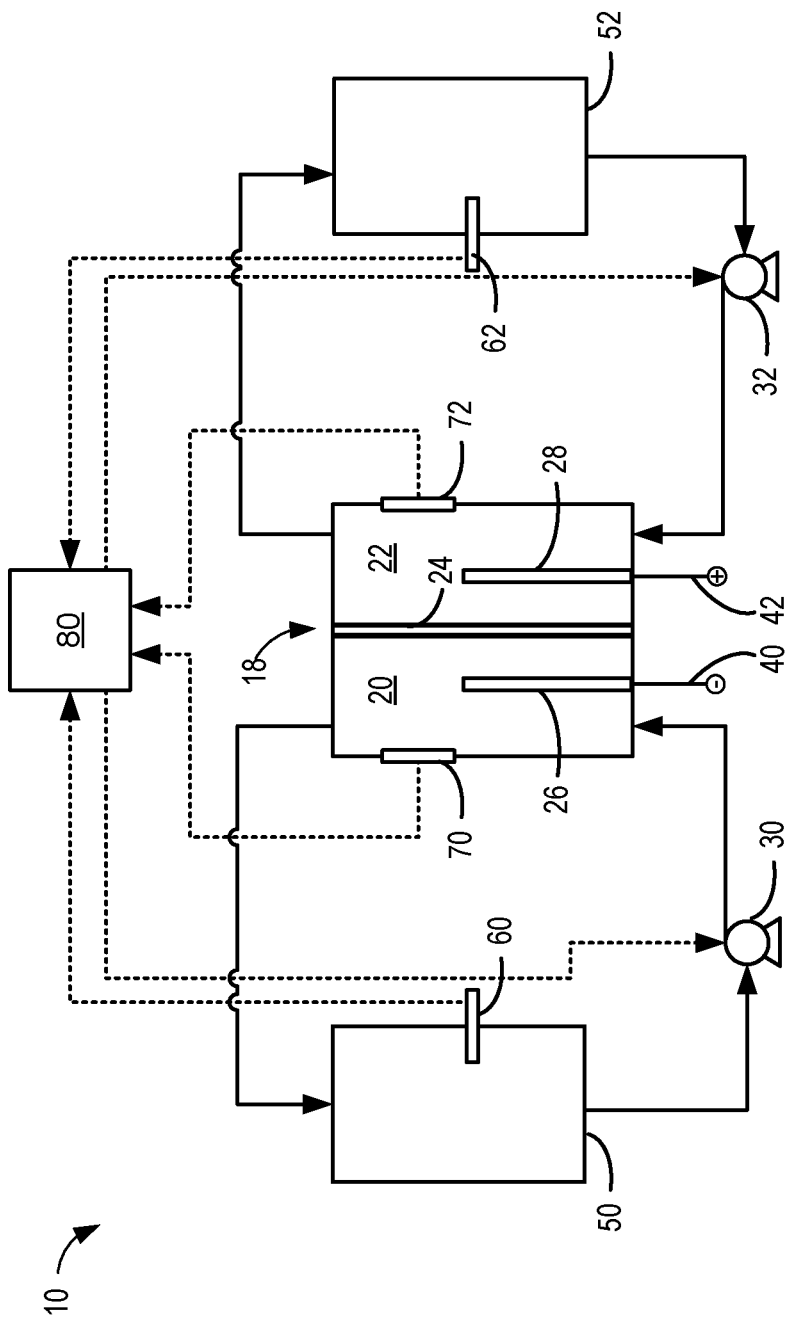
FIG. 1 shows a schematic of an example redox flow battery system.
Figure 2:
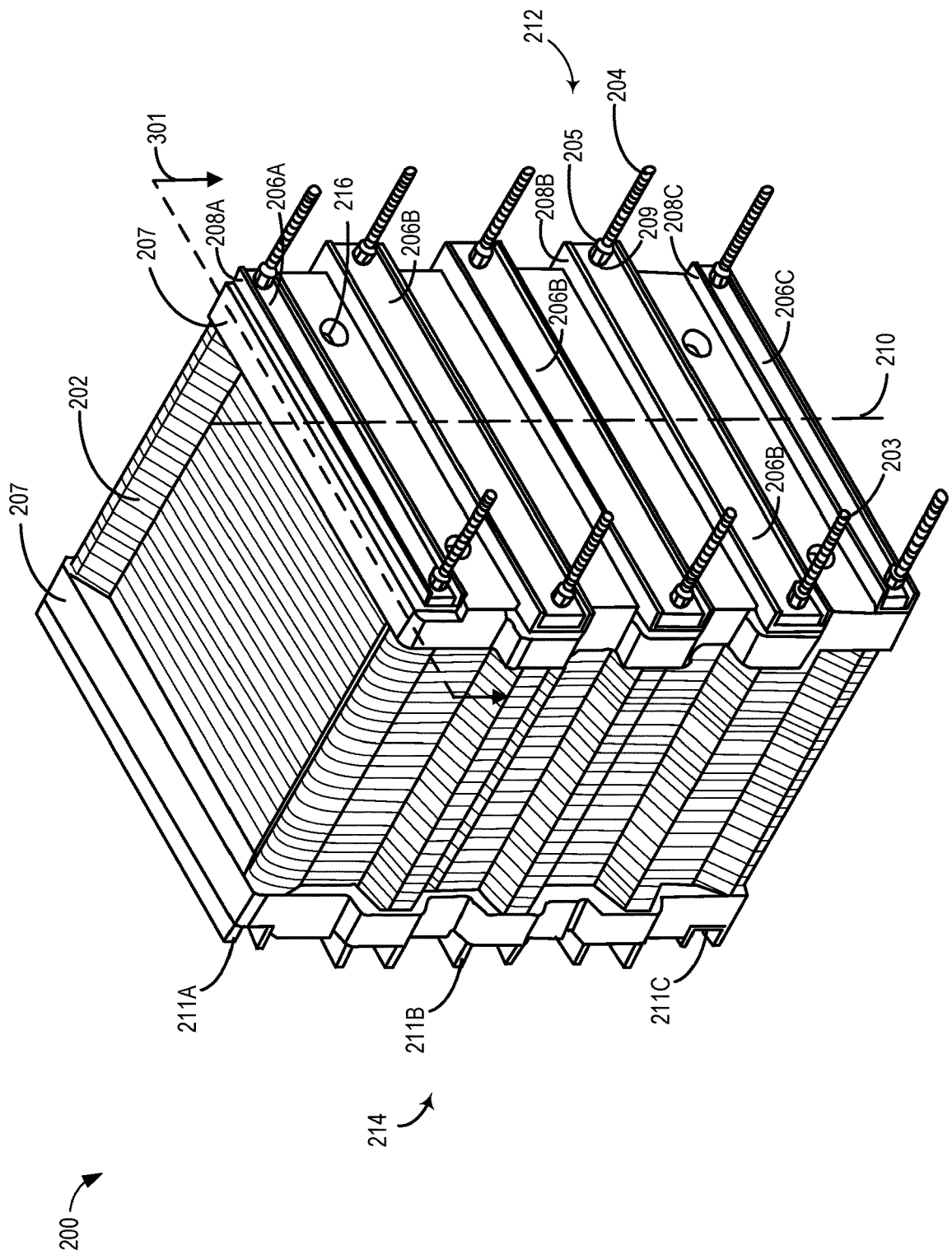
FIG. 2 shows a schematic of a first embodiment of a battery cell stack of a flow battery system.
Figure 3:
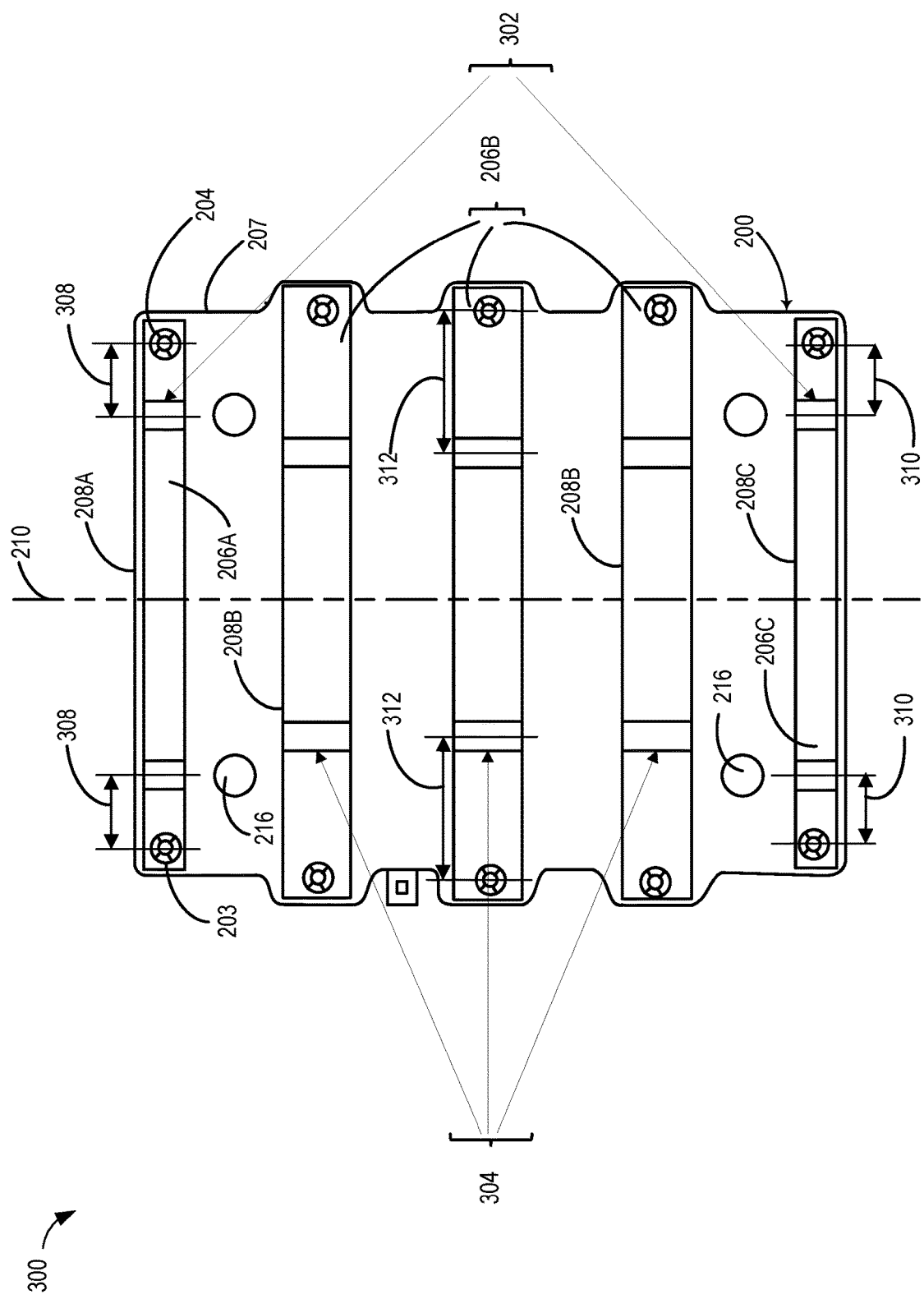
FIG. 3 shows a cross section view of the first embodiment of the battery cell stack.

Redox flow battery systems, as illustrated in an example at FIG. 1, may include an all-iron hybrid redox flow battery (IFB), a Zn—Br2+ flow battery, or a Zn—NiOOH (MnO2) battery, and may comprise an electrode. The electrode may be used as the plating electrode, the redox electrode or both of the electrodes in a redox flow battery system. FIG. 2 shows a first embodiment of a battery cell stack of a flow battery. The battery cell stack is secured on both sides with a tie rod assembly system which applies a compressive force on a set of leaf springs mounted on a first side of the cell stack. FIG. 3 shows a cross sectional view of the first embodiment of the battery cell stack, with a plurality of fulcrums placed at different distances behind a set of leaf springs attached to top, center and bottom positions on the cell stack. The fulcrums may be placed behind each leaf spring to direct a compressive load imposed on the battery cell stack along active areas of the cell stack, thereby minimizing deflection of pressure plates attached to the cell stack.

Figure 4A:
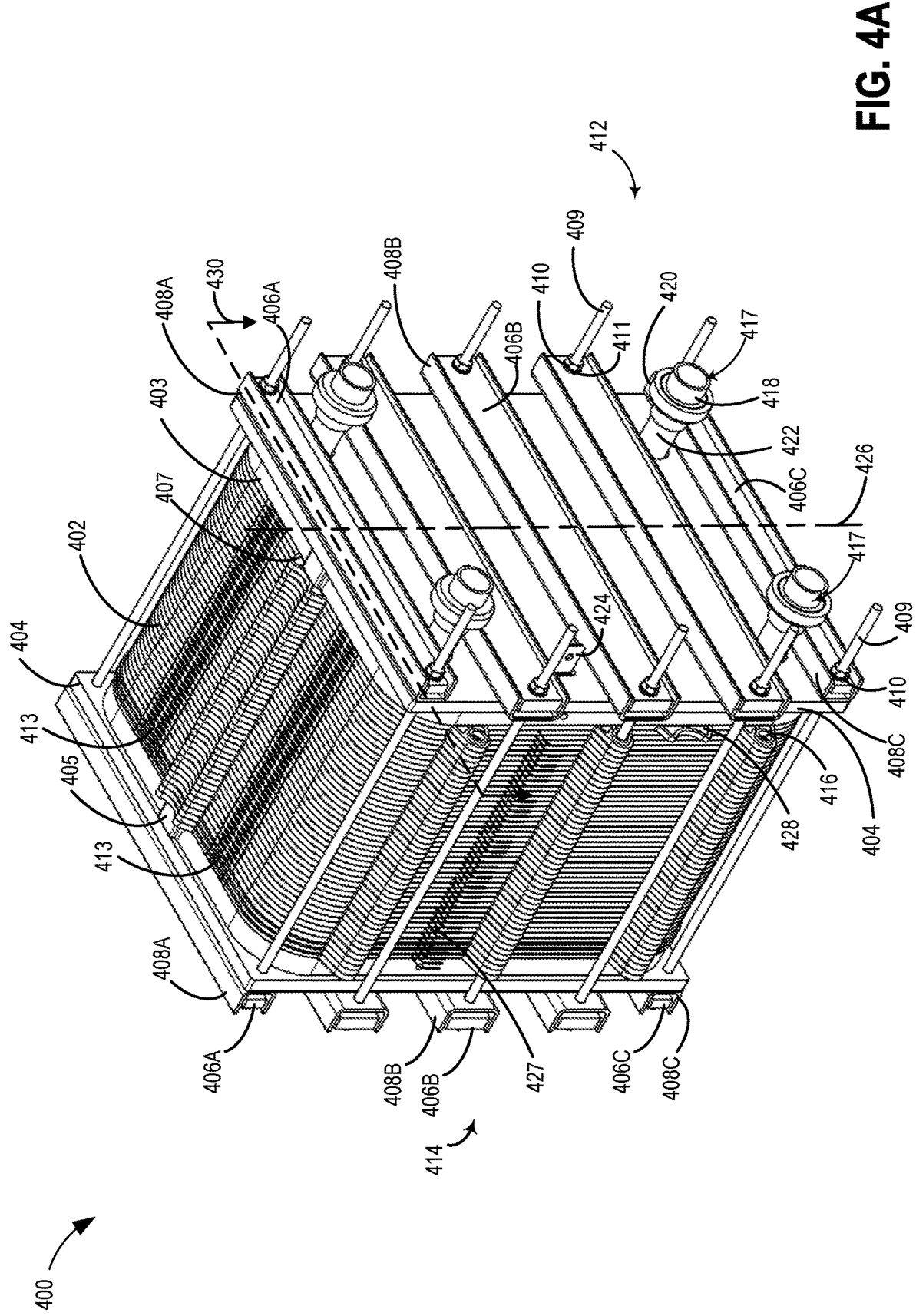
FIG. 4A shows a schematic of a second embodiment of a battery cell stack of a flow battery system.
Figure 4B:
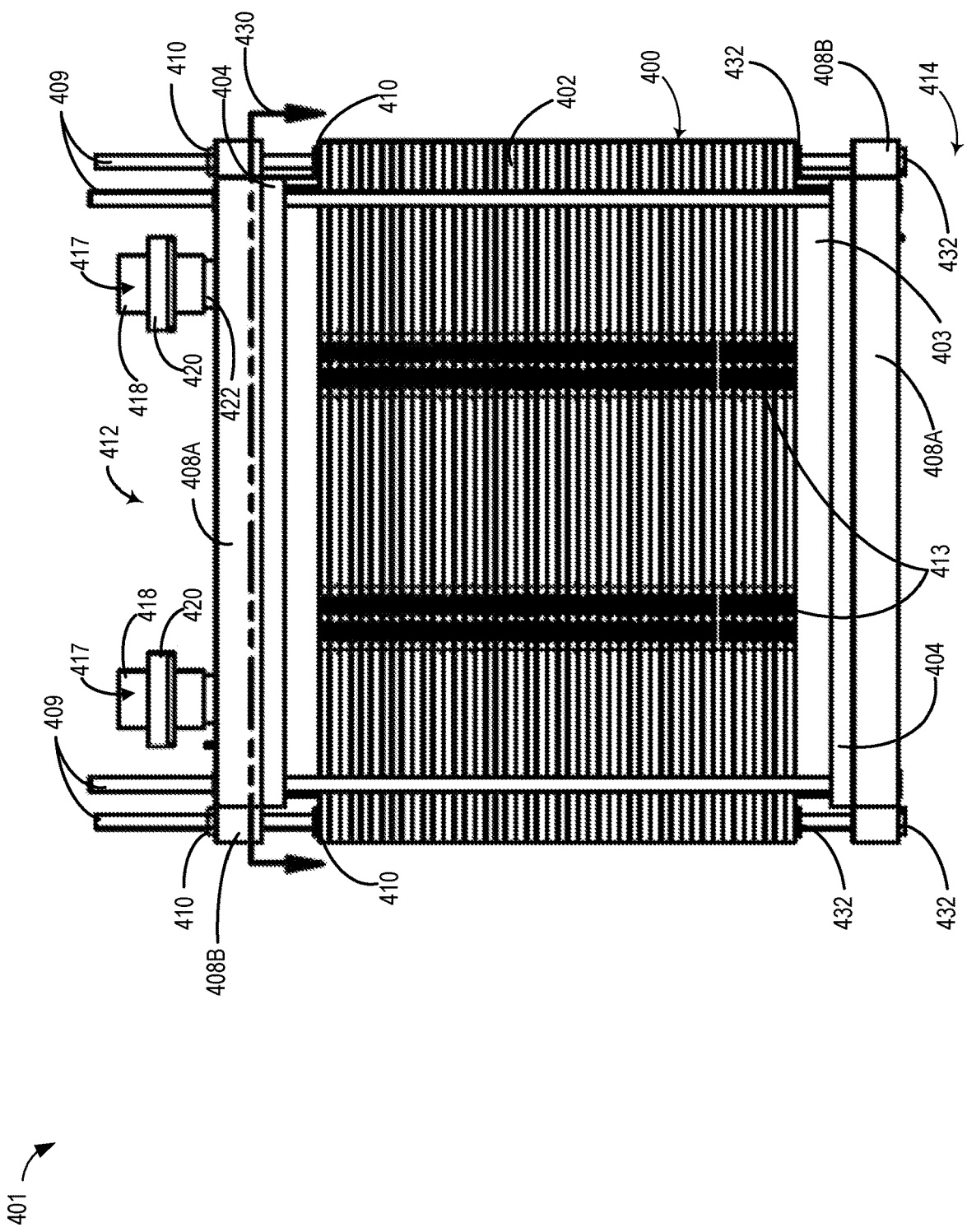
FIG. 4B shows a plan view of the second embodiment of the battery cell stack.
Figure 5:
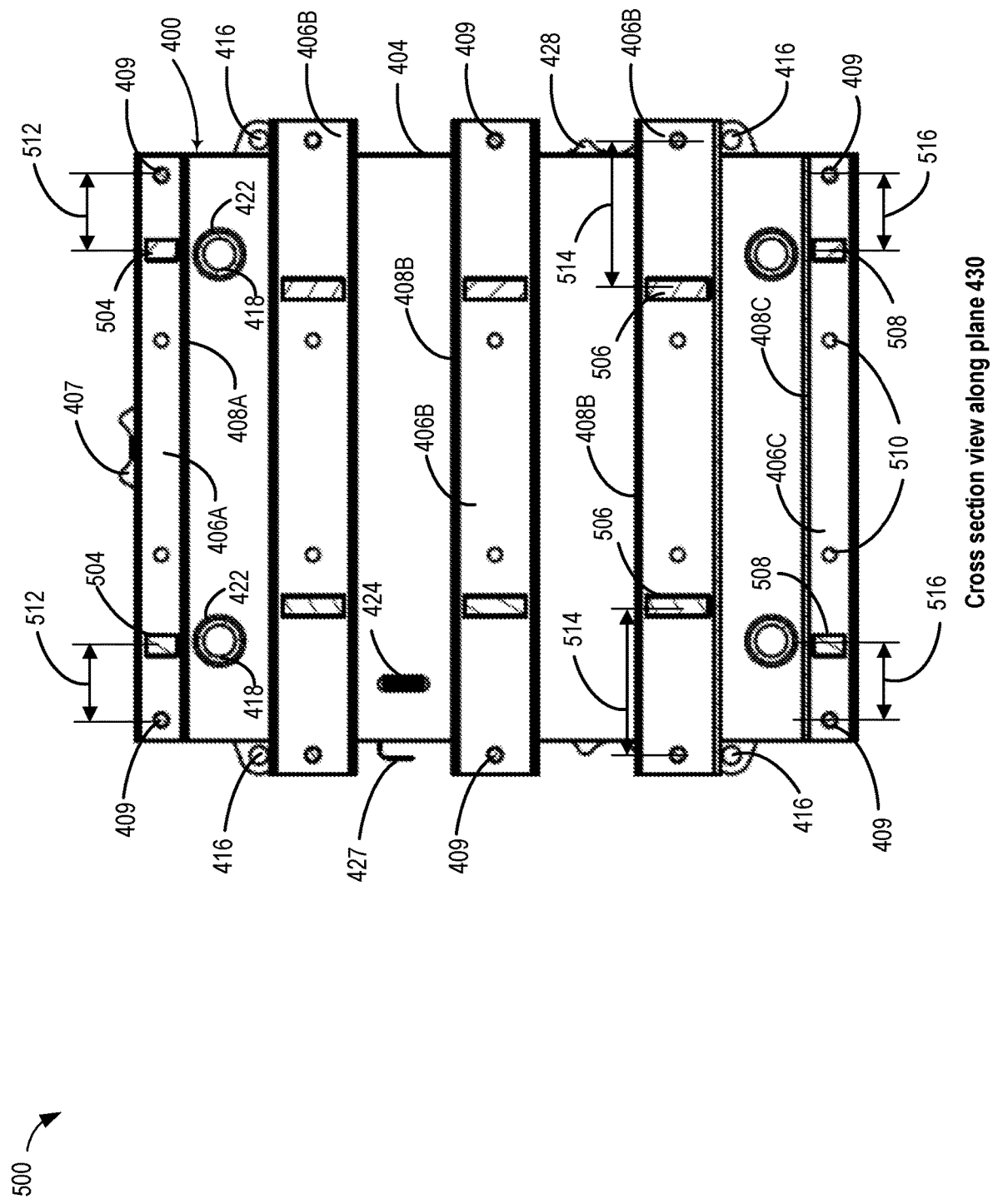
FIG. 5 shows a cross section view of the second embodiment of the battery cell stack.

A second embodiment of the battery cell stack is shown in FIG. 4A. The battery cell stack is held together by a system comprising a tie rod assembly, reinforcement bars, and leaf springs. Pressure plates may be positioned on each side of the cell stack, and secured together using tie rods which may extend along a length of the cell stack. A first pressure plate may be positioned at an upstream end of the cell stack, and a second pressure plate may be positioned at a downstream end of the cell stack. A first set of tie rods may secure a plurality of leaf springs on a first side of the cell stack, and may extend through the first and second pressure plate to a plurality of leaf springs mounted on a second side of the cell stack. A second set of tie rods may secure leaf springs on the first side of the cell stack, and may extend along the cell stack to the leaf springs mounted on the second side of the stack. FIG. 4B shows a plan view of the second embodiment of the battery cell stack, with the first and second set of tie rods extending from the first side to the second side of the cell stack. FIG. 5 shows a cross sectional view of the second embodiment of the battery cell stack. The leaf springs on the cell stack may be mounted at top, center and bottom positions, as shown in FIG. 5. A pair of fulcrums may be positioned adjacent to each leaf to direct compressive loads exerted on the battery cell stack along active areas of the cell stack. A first set of fulcrums on the top leaf springs may be positioned at a first distance from the tie rods securing the leaf spring to the cell stack. A second set of fulcrums on the center leaf springs may be positioned at a second distance from the tie rods securing the second leaf spring to the cell stack. A third set of fulcrums on the bottom leaf springs may be positioned at a third distance from the tie rods securing the third leaf spring to the cell stack. In this way, the fulcrums on the top, center and bottom leaf springs may be adequately positioned to redistribute loads imposed on the battery cell stack, while keeping deflections on the cell stack within allowable thresholds.

Figure 6:
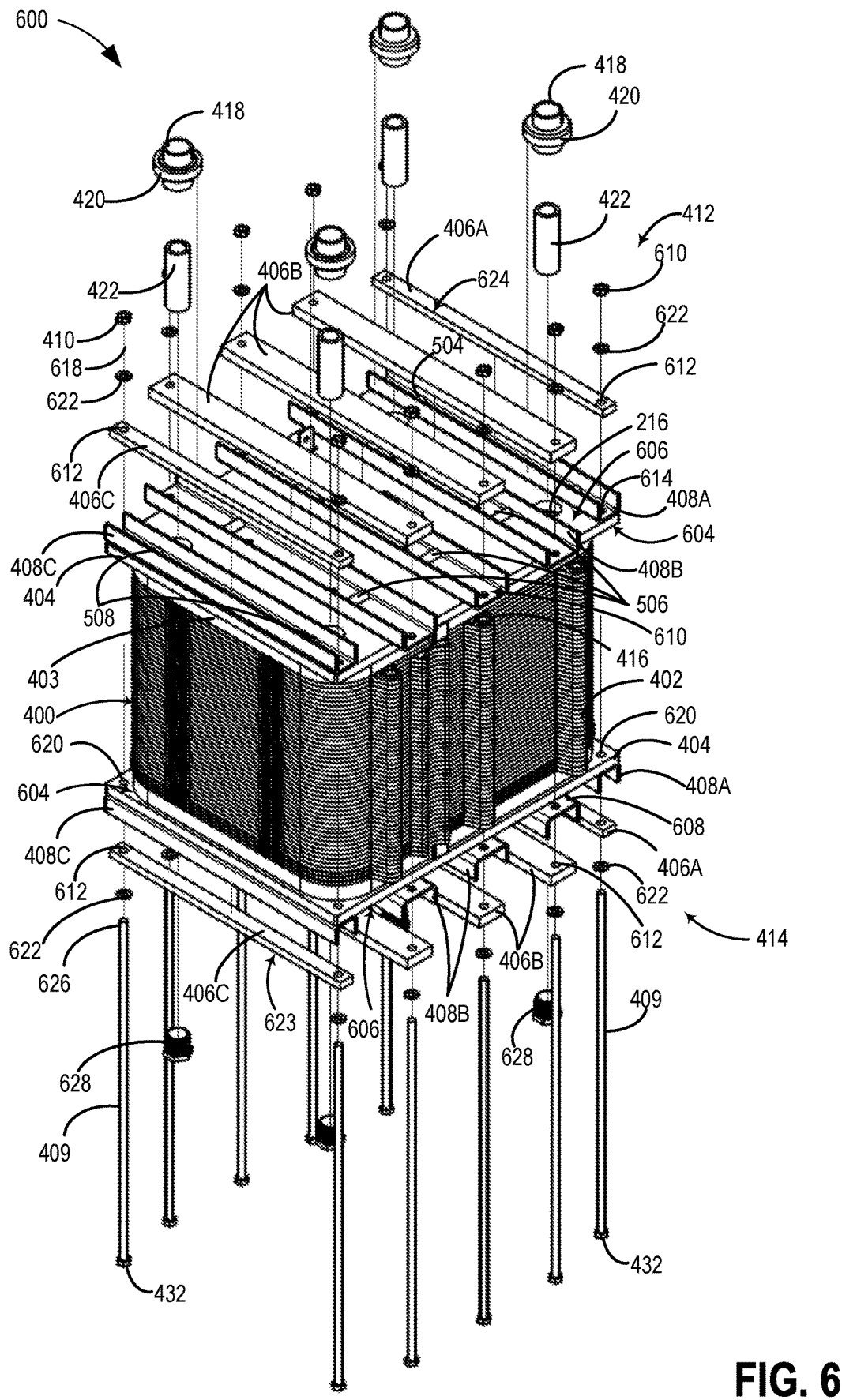
FIG. 6 shows an exploded view of the second embodiment of the battery cell stack.
Figure 7:
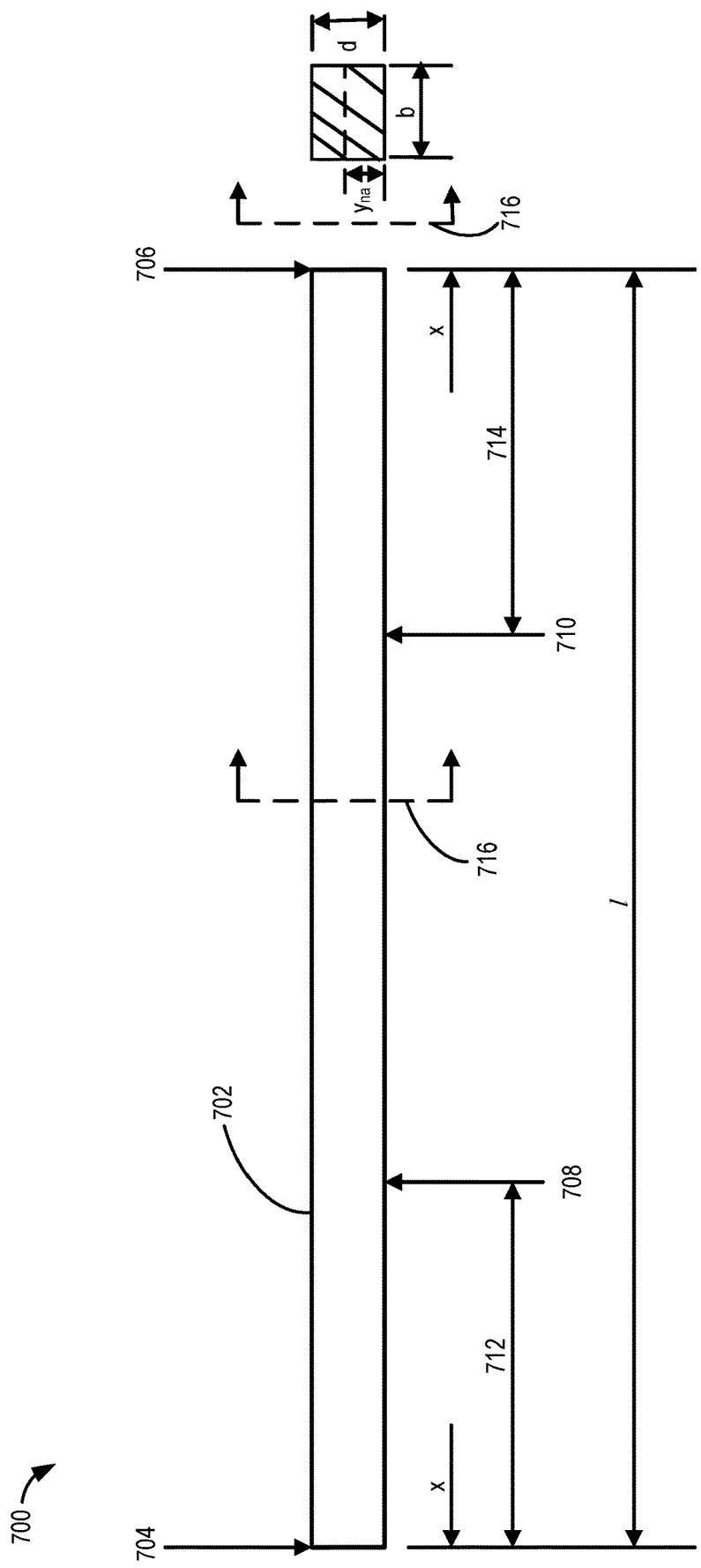
FIG. 7 shows an example leaf spring with operating loads and fulcrums positioned to distribute loading imposed on a battery cell stack.
Figure 8:
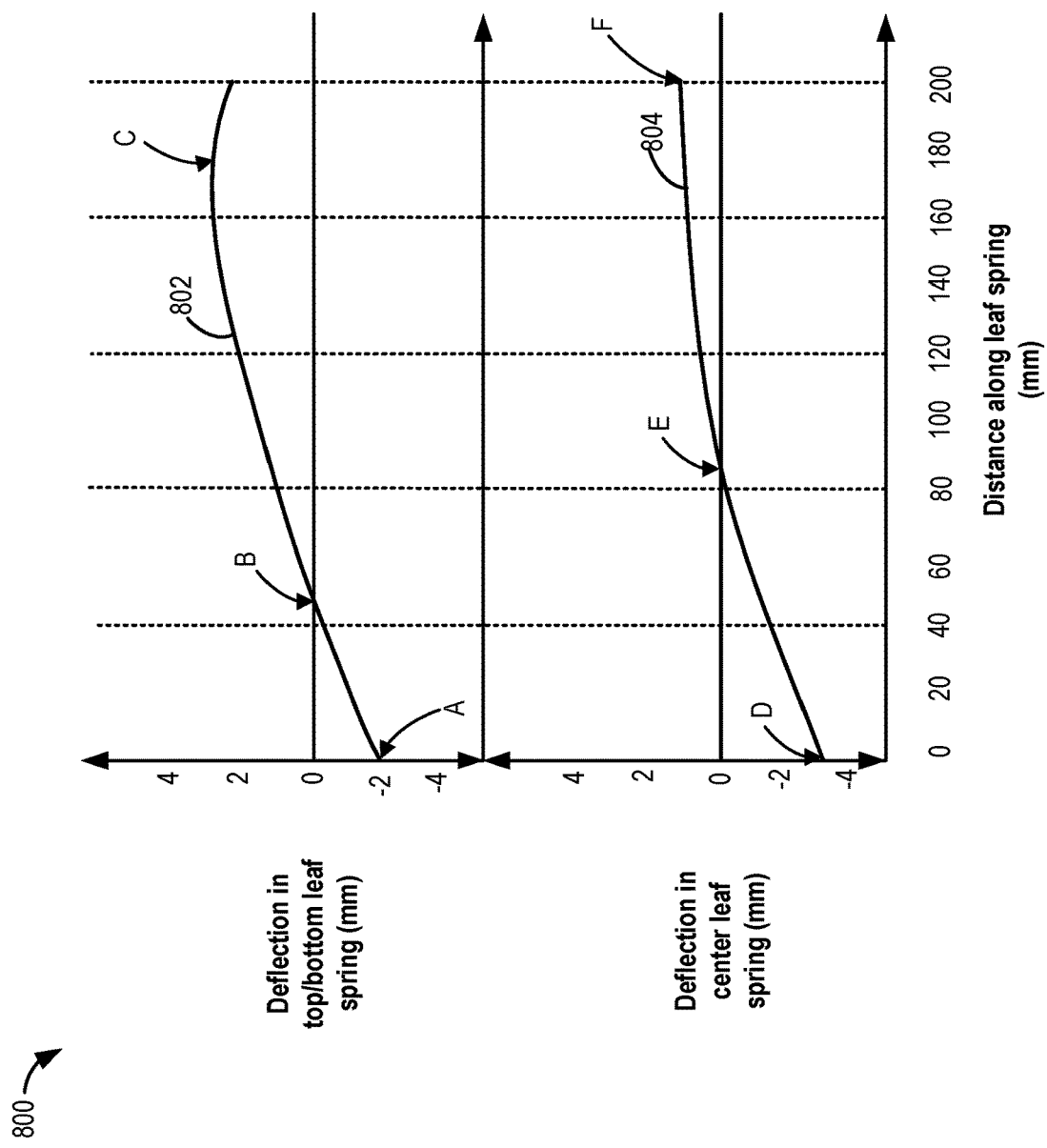
FIG. 8 shows deflection of an example leaf spring placed at the top, center and bottom of a battery cell stack.

FIG. 6 shows an exploded view of the second embodiment of the battery cell stack. The battery cell stack may be assembled together using tie rods extending through leaf springs (held in reinforcement bars), and pressure plates placed on either side of the cell stack. In addition, a locking assembly comprising a bushing, a collar and a shaft, may be provided to close off or block openings in the cell stack. FIG. 7 shows an example leaf spring (depicted as a beam) with operating loads and fulcrums positioned to direct compressive loads (imposed on a battery cell stack) along active areas of the cell stack. FIG. 8 shows deflection of example leaf springs of the battery cell stacks shown in FIGS. 2-4A. The example leaf springs may be placed at the top, center and bottom of each battery cell stack, with fulcrums positioned at chosen locations along each leaf spring, as shown in FIGS. 3 and 5.

FIGS. 1-6 show example configurations with relative positioning of the various components of the battery cell stack. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. FIGS. 1-6 are drawn to scale, although other relative dimensions may be used.

Turning to FIG. 1, an example schematic of a redox flow battery system 10 is provided wherein a single redox battery cell 18 is illustrated. The single redox battery cell generally includes a negative electrode compartment 20, a positive electrode compartment 22, and a separator 24. The separator 24 is positioned between the negative and positive electrode compartments. In some examples, multiple redox battery cell stacks 18 may be combined in series and/or in parallel to create a higher voltage and/or current in the redox flow battery system.

The negative electrode compartment 20 may comprise a negative electrode 26 and a first electrolyte, also referred to as a negative electrode electrolyte, containing electro-active materials. Similarly, the positive electrode compartment 22 may comprise a positive electrode 28 and a second electrolyte, also referred to as a positive electrode electrolyte, containing electro-active materials.

The separator 24 may comprise an electrically insulating ionic conducting barrier. The separator functions to prevent bulk mixing of the first electrolyte in the negative electrode compartment 20 with the second electrolyte in the positive electrode compartment 22 while still allowing conductance of specific ions there through. In one example, separator 24 may comprise an ion-exchange membrane. In another example, separator 24 may comprise a micro-porous membrane.

The electrolytes may typically be stored in tanks external to the redox battery cell 18. The electrolyte may be pumped via pumps 30 and 32 through the negative electrode compartment 20 and the positive electrode compartment 22 respectively. In the example illustrated herein, the first electrolyte is stored at a first electrolyte source 50, which may further comprise an external first electrolyte tank (not shown) and the second electrolyte is stored at a second electrolyte source 52, which may further comprise an external second electrolyte tank (not shown).

During battery charge, a current is applied to the negative battery terminal 40 and the positive battery terminal 42. During charge, the positive electrode electrolyte is oxidized, loses one or more electrons, at the positive electrode 28, and the negative electrode electrolyte is reduced, gains one or more electrons, at the negative electrode 26.

During battery discharge, the reverse redox reactions to the charge reactions occur at the electrodes. Thus, during discharge, the positive electrode electrolyte is reduced at the positive electrode 28 and the negative electrode electrolyte is oxidized at the negative electrode 26. In one example, the positive electrode and the negative electrode may be the carbon coated plastic mesh electrode described below.

The electrochemical redox reaction in the negative electrode compartment 20 and the positive electrode compartment 22 maintain an electrical potential difference across the redox flow battery system and can induce a current through a conductor while the reactions are sustained. The amount of energy, the capacity, stored by a redox flow battery system may be limited by the amount of electro-active material in the electrolytes for discharge. The amount of electro-active material is based on the total volume of the electrolytes and the solubility of the electro-active materials. Furthermore, the amount of energy stored by the redox flow battery system may be limited by the amount of solid iron the negative electrode can store.

During operation of the redox flow battery system, sensors and probes may be used to monitor and control chemical properties of the electrolyte, such as electrolyte pH, concentration, state of charge, and the like. For example, the redox flow battery system may comprise sensors 60 and 62, which may be positioned to monitor the electrolyte conditions at the first electrolyte source 50 and the second electrolyte source 52 respectively. As another example, the redox flow battery system may comprise sensors 70 and 72, which may be positioned to monitor the conditions at the negative electrode compartment 20 and the positive electrode compartment 22 respectively.

The redox flow battery system may further comprise other sensors positioned at other locations throughout the redox flow battery system to monitor the electrolyte chemical properties and other properties. For example, the redox flow battery system may comprise one or more sensors disposed within an external acid tank, wherein acid may be supplied via an external pump to the redox flow battery system in order to reduce precipitate formation in the electrolytes. The one or more sensors may monitor the acid volume or the pH within the external acid tank. Additional external tanks and sensors may be included for supplying other additives to the redox flow battery system.

The redox flow battery system may be controlled at least partially by a control system including controller 80. The controller 80 may receive sensor information from the various sensors positioned within the redox flow battery system. For example, the controller 80 may actuate pumps 30 and 32 to control the electrolytes' flow through the redox battery cell 18. Thus, the controller 80 may be responsive to one or more of the sensors and/or probes positioned throughout the redox flow battery system.

In a hybrid flow battery system, the negative electrode 26 may be referred to as the plating electrode and the positive electrode 28 may be referred to as the redox electrode. The negative electrode electrolyte within the negative electrode compartment 20 (herein also referred to as the plating side) of the battery may be referred to as the plating electrolyte and the positive electrode electrolyte within the positive electrode compartment 22 (herein also referred to as the redox side) of the battery may be referred to as the redox electrolyte.

As mentioned previously, one example of a hybrid flow battery is an IFB, which uses iron as an electrolyte for plating and redox reactions. The IFB may comprise a benign electrolyte, including iron salts. The benign electrolyte is not too acidic (pH<0) or too alkaline (pH>14) and may have a pH near neutral, for example: IFB negative electrolyte operates between pH of 3-4. As used herein, the phrase pH around neutral provides for a pH range wherein the plastic mesh material used for the disclosed electrode does not degrade in the electrolyte at the potentials applied during charging and discharging of the redox flow battery. The IFB includes a plating electrode, where iron is deposited during charge and de-plated during discharge, a redox electrode, where the ferrous and ferric ions redox reaction occurs, a separator, which prevents electrolytes from mixing and provides an ionic pathway, and electrolytes, where the energy of the IFB is stored. The capacity of an IFB battery may be driven by the amount of electrolytes stored in the external tanks as well as the amount of iron plated on the negative electrode.

The electrochemical redox reactions for an IFB battery are summarized in equations (1) and (2) wherein the forward reactions (left to right) indicate electrochemical reactions during battery charge and the reverse reactions (right to left) indicate electrochemical reaction during battery discharge.

$$Fe^{2+} + 2e^- \leftrightarrow Fe^0 \text{ (Negative Electrode)} \quad (1)$$

$$2Fe^{2+} \leftrightarrow 2Fe^{3+} + 2e^- \text{ (Positive Electrode)} \quad (2)$$

On the plating side of the IFB, the plating electrolyte provides a sufficient amount of Fe2+ so that during charge, the Fe2+ gains two electrons from the negative electrode to form Fe0, which plates onto a substrate. During discharge, the plated Fe0 loses two electrons, ionizing into Fe2+ and dissolving back into the plating electrolyte. The equilibrium potential of the negative electrode reaction is −0.44V and thus, reaction (1) provides a negative terminal for the IFB system. On the redox side of the IFB, the redox electrolyte provides $Fe^{2+}$ during charge which loses an electron to the redox electrode and oxidizes to $Fe^{3+}$. During discharge, the $Fe^{3+}$ gains an electron from the redox electrode producing $Fe^{2+}$. The equilibrium potential of the positive electrode reaction is +0.77V, and thus, reaction (2) provides a positive terminal for the IFB system.

Referring to FIG. 2, a three-dimensional view of a first embodiment of a battery cell stack 200, which may be used as stack 18 of flow battery 10 is shown. The battery cell stack 200 includes a plurality of reactor cells 202 consistent with the embodiments disclosed herein. The reactor cells 202 may be held together by mounting pressure plates 207 and reinforcement bars 208A-C holding leaf springs 206A-C, on either side of the reactor cells, and securing the cell stack using tie rod assemblies 203 and 204. The battery cell stack 200 may include a plurality of openings 216. The openings 216 may be closed off or blocked by a locking assembly or other suitable closing mechanisms such as caps, plugs etc.

As shown in FIG. 2, the reactor cells 202 in the battery cell stack may be secured together using a plurality of tie rod assemblies 203 and 204, which may be adjustable to apply a uniform compression load across the cell stack. Alternatively, the reactor cells 202 in the battery cell stack may be secured together using a plurality of custom manufactured bolts or other suitable fasteners. The leaf springs 206A-C may be secured inside reinforcement bars 208A-C, respectively using tie rod assemblies 203 and 204, and each reinforcement bar 208A-C may be directly or indirectly attached to pressure plate 207 on a first side 212 or a second side 214 of the battery cell stack 200, using an interference fit, fastener, weld, glue, or other means of mechanical assembly, for example. In one embodiment, the pressure plate 207 may be securely fastened to reinforcement bars 208A-C using a nut, washer, and a bolt assembly. In an alternative example, the pressure plate 207 may be secured to reinforcement bars 208A-C using rivets. In other examples, the pressure plate 207 may be welded to reinforcement bars 208A-C. In further examples, an interference fit may be employed to secure the pressure plate 207 and reinforcement bars 208A-C, together. In other embodiments, the pressure plate 207 may be secured to reinforcement bars 208A-C by a compression force exerted on each leaf spring of the cell stack, for example. Each leaf spring 206A-C, placed in contact with two fulcrums (not shown) in-board of each reinforcement bar 208A-C, may be compressed at a rod location 209 by tightening a nut 205 of the tie rod assemblies 203 and 204, with a smooth section of the bolt passing through the cell stack to reinforcement bars 211A-C coupled directly to pressure plate 207, on the second side 214 of the battery cell stack. A plurality of nuts (not shown) may be tightened on each tie rod assembly at the second side 214, providing additional compressive force on the cell stack.

The compression force imposed on the leaf springs 206A-C may be redirected at the fulcrums to an active area of the cell stack to reduce deflection of the pressure plates 207. The fulcrum locations along each leaf spring 206A-C may be chosen by iteration based on a desired cell stack loading profile and other structural considerations. As an example, the fulcrums may be cylindrical, half cylinders, or formed into an ultimate shape determined through iteration. In one example, the ultimate shape of the fulcrum may spread the load exerted on the leaf springs 206A-C over pressure plates 207, thereby providing a desired load profile. The fulcrums may be attached to each reinforcement bar 208A-C or placed directly on the pressure plates 207. In another example, the fulcrums may be formed into the pressure plates 207 or the reinforcement bars 208A-C. In other examples, the leaf springs 206A-C may be formed to provide a fulcrum surface, in form of a pre-bent spring. The reinforcement bars 208A-C may be u-channels or tubes, encased or over-molded onto the pressure plates 207. In alternative embodiments, the leaf springs 206A-C may be directly attached to the pressure plates 207, without using the reinforcement bars 208A-C. In further embodiments, the pressure plates 207 may have a convex surface that act as the fulcrum. Further, two or more fulcrums may be provided at various heights on the cell stack 200 to conform to a bent shape of the leaf springs 206A-C.

The leaf springs 206A-C may be secured on pressure plates 207 on either the first side 212 or second side 214 of the cell stack 200, at different heights. Alternatively, the leaf springs 206A-C may be secured to both the first side 212 and second side 214 of the cell stack 200 at different positions. In one example, each leaf springs 206A-C encased within each reinforcement bar 208A-C, may be attached to the pressure plates 207 of the cell stack 200 at top, center and bottom positions; each leaf spring with different fulcrum positions compared with one another, for example, with the center fulcrums closer to center 210 than the top/bottom fulcrum positions relative to the center. In other examples, the leaf springs 206A-C may be provided in various shapes and sizes. For example, a first size of leaf spring may be placed in the top and bottom positions of the battery cell stack 200, while a second size of leaf spring may be placed in the center position. The fulcrum positions of the top, center and bottom leaf springs may be adjustable to accommodate different stack loading while keeping spring deflections to allowable limits. In this way, the leaf springs may be designed to provide uniform loading over the battery cell stack during operation of the flow battery. Details of leaf spring placement and fulcrum locations are disclosed further below with reference to FIG. 3 depicting a cross sectional view along plane 301 through the battery cell stack.

Referring to FIG. 3, a cross sectional view 300 along plane 301 of cell stack 200 of flow battery 10 is shown. As illustrated, a plurality of leaf springs 206A-C may be attached at different positions to pressure plate 207, and secured on a first or second side (e.g., first side 212 or second side 214 of cell stack 200 shown in FIG. 2) of the battery cell stack. Alternatively, the leaf springs 206A-C may be attached to the first and second side of the cell stack, at different positions. Top leaf spring 206A, center leaf springs 206B and bottom leaf spring 206C may be held in reinforcement bars 208A-C, respectively, and mounted to the pressure plate 207 by tightening nuts on tie rod assemblies 203 and 204. Alternatively, the leaf springs 206A-C on the cell stack may be secured to the pressure plate 207 using custom manufactured bolts. The top leaf spring 206A has two fulcrums 302 placed at a distance 308. The center leaf springs 206B, each leaf with two fulcrums 304 placed at a distance 312, may be held in reinforcement bars 208B and mounted to the middle of the cell stack 200 by tightening nuts on the tie rod assemblies of the center leaf spring 206B. Likewise, the bottom leaf spring 206C, with a pair of fulcrums 302 positioned at distance 310, may be held inside reinforcement bar 208C and mounted to the bottom of the cell stack by tightening nuts of the tie rod assemblies 203 and 204 on the bottom leaf spring 206C. The fulcrums 304 of the center leaf spring 206B may be placed closer to center 210 than fulcrums of the top and bottom leaf springs 206A and 206C, respectively.

The top, center and bottom leaf springs may be sized based on an expected cell stack loading profile. The type of loading profile and extent of deflection of each leaf spring may depend on magnitude of compression load applied at the tie rod assembly, leaf spring geometry (i.e., shape, width and breadth of each leaf) and fulcrum distances along each leaf spring 206A-C. In one example, the top leaf spring 206A and bottom leaf spring 206C may be selected to have similar compression loads and geometry, and the fulcrums in each leaf spring may be placed at similar distances. Due to similar compression loads, geometry and fulcrum positions, the resulting loading profiles in the top and bottom leaf springs may be similar. Likewise, compression loads, sizes of the center leaf springs 206B and fulcrum distances of each center leaf may be selected to be similar yielding identical loading profiles. Alternatively, the top leaf spring 206A and bottom leaf spring 206C may selected to have different compression loads, leaf spring sizes, and the fulcrums in each leaf may be placed at different distances. In this case, a loading profile in the top leaf spring 206A may differ from a load profile of the bottom leaf spring 206C. Likewise, different compression loads, leaf spring sizes and fulcrum distances on the center leaf springs 206B may be selected to produce different loading profiles on each leaf spring.

By selecting different leaf spring sizes for the top, center and bottom leaf springs, and choosing fulcrum locations (in each leaf spring) based on a desired loading profile, deflection of the cell stack may be reduced to threshold levels while improving performance of the flow battery.

Referring to FIG. 4A, a three-dimensional view of a second embodiment of a cell stack 400, which may be used as stack 18 of flow battery 10 is shown. The cell stack 400 includes a plurality of reactor cells 402 wound around a cell housing 403 which is held together by pressure plates 404 and reinforcement bars 408A-C (holding leaf springs 406A-C) mounted on either side of the cell housing, and secured using bolts 409. The cell housing 403 may include a cross member 405 having an elevated portion 407. When wound around the cell housing 403, reactor cells 402 may be in face-sharing contact with the elevated portion 407 of the cross member 405, and may form a plurality of overlapping seams 413. A plurality of locking assemblies 417 may provide a means of closing openings (such as openings 216 shown in FIG. 2) in the cell stack 400. Each locking assembly 417 comprises a bushing 418, a collar 420 and a shaft 422. The locking assemblies 417 may be positioned at top and bottom locations of the cell stack, for example. A plate 424 may be inserted in a slot formed in the pressure plate 404, mounted on a first side 412 of the cell stack. The battery cell stack 400 may also include an extended component 427 and a side component 428.

As shown in FIG. 4A, the reactor cells 402 in the battery cell stack 400 may be secured together using a plurality of bolts 409, which may be adjustable to apply a uniform compression load across the cell stack. Alternatively, the reactor cells 402 in the battery cell stack may be secured together using a plurality of tie rods or other suitable fasteners. The leaf springs 406A-C may be secured inside reinforcement bars 408A-C, respectively using bolts 409, and each reinforcement bar 408A-C may be directly or indirectly attached to pressure plate 404 on the first side 412 and a second side 414 of the battery cell stack 400, using an interference fit, fastener, weld, glue, or other means of mechanical assembly, for example. In a preferred embodiment, each pressure plate 404 may be securely fastened to reinforcement bars 408A-C using a nut, washer, and a bolt assembly. In an alternative example, each pressure plate 404 may be secured to reinforcement bars 408A-C using rivets. In other examples, each pressure plate 404 may be welded to reinforcement bars 408A-C. In further examples, an interference fit may be employed to secure each pressure plate 404 and reinforcement bars 408A-C, together. In other embodiments, each pressure plate 404 may be secured to reinforcement bars 408A-C by a compression force exerted on each leaf spring 406A-C, for example.

Each leaf spring 406A-C, placed in contact with two fulcrums (not shown) in-board of reinforcement bar 408A-C, respectively, may be compressed at a rod location 411 by tightening a nut 410 of the bolts 409, with a smooth section of the bolt extending along a periphery of the cell stack to reinforcement bars 408A-C coupled directly or indirectly to pressure plate 404, on the second side 414 of the battery cell stack. Alternatively, each leaf spring 406A-C may be compressed at the rod location 411 by tightening the nut 410 used in conjunction with bolt 409, with a smooth section of the bolt passing through an opening 416 in the cell stack to reinforcement bars 408A-C coupled directly or indirectly to pressure plate 404 on the second side 414 of the battery cell stack. A plurality of nuts (not shown) may be tightened on the bolts 409 at the second side 414, providing additional compressive force on the cell stack.

Referring to FIG. 4B, a plan view 401 of the second embodiment of the cell stack 400 is shown. As shown in FIG. 4B, the top leaf spring 406A may be compressed at the rod location by tightening the nut 410 on each bolt 409, with the smooth section of the bolt extending along the length of the cell housing 403 to reinforcement bar 408B coupled directly or indirectly to pressure plate 404 on the second side 414 of the battery cell stack. The center leaf spring 406B may be compressed at the rod location by tightening the nut 410 on each bolt 409, with the smooth section of the bolt passing an opening (such as opening 416 shown in FIG. 4A) in the cell stack to reinforcement bar 408 on the second side 414 of the battery cell stack. The nuts 432 on each tie rod assembly on the second side 414 of the battery cell stack 400 may be tightened to adequately secure the cell stack.

Turning back to FIG. 4A, the compression force imposed on the leaf springs 406A-C may be redirected at the fulcrums to an active area of the cell stack to reduce deflection of the pressure plates 404. The fulcrum locations along each leaf spring 406A-C may be chosen by iteration based on a desired cell stack loading profile and other structural considerations. As an example, the fulcrums may be cylindrical, half cylinders, or formed into an ultimate shape determined through iteration. In one example, the ultimate shape of the fulcrum may spread the load exerted on the leaf springs 406A-C over pressure plates 404, thereby providing a desired load profile. The fulcrums may be attached to each reinforcement bar 408A-C or placed directly on the pressure plates 404. In another example, the fulcrums may be formed into the pressure plates 404 or the reinforcement bars 408A-C. In other examples, the leaf springs 406A-C may be formed to provide a fulcrum surface, in form of a pre-bent spring. The reinforcement bars 408A-C may be u-channels or tubes, encased or over-molded onto the pressure plates 404. In alternative embodiments, the leaf springs 406A-C may be directly attached to the pressure plates 404, without using the reinforcement bars 408A-C. In further embodiments, the pressure plates 404 may have a convex surface that act as the fulcrum. Further, two or more fulcrums may be provided at various heights on the cell stack 400 to conform to a bent shape of the leaf springs 406A-C. The leaf springs 406A-C may be secured on pressure plates 404 on the first side 412 and second side 414 of the cell stack 400, at different heights. Alternatively, the leaf springs 406A-C may be secured to either the first side 412 or second side 414 of the cell stack 400 at different positions. In one example, each leaf spring 406A-C encased within each reinforcement bar 408A-C, may be attached to the pressure plates 404 on either side of the cell stack 400 at top, center and bottom positions; each leaf spring with different fulcrum positions compared with one another, for example, with the center fulcrums closer to center 426 than the top/bottom fulcrum positions relative to the center. In other examples, the leaf springs 406A-C may be provided in various shapes and sizes. For example, a first size of leaf spring may be placed in the top and bottom positions of the cell stack 400, while a second size of leaf spring may be placed in the center position. The fulcrum positions of the top, center and bottom leaf springs may be adjustable to accommodate different stack loading while keeping spring deflections to allowable limits. In this way, the leaf springs may be designed to provide uniform loading over the battery cell stack 400 during operation of the flow battery. Details of leaf spring placement and fulcrum locations are disclosed further below with reference to FIG. 5, showing a cross section view of the cell stack along plane 430.

Referring to FIG. 5, a cross sectional view 500 along plane 430 of cell stack 400 of flow battery 10 is shown. A plurality of leaf springs 406A-C may be attached at different positions to pressure plate 404, and secured on a first and second side (e.g., first side 412 and second side 414 of cell stack 400 shown in FIG. 4A) of the battery cell stack. Alternatively, the leaf springs 406A-C may be attached to either the first or second side of the cell stack, at different positions. Top leaf spring 406A, center leaf springs 406B and bottom leaf spring 406C may be held in reinforcement bars 408A-C, respectively, and mounted to the pressure plate 404 by tightening nuts on bolts 409. Alternatively, the leaf springs 406A-C on the cell stack may be secured to the pressure plate 404 using tie rods, such as tie rod assemblies 203 and 204 shown in FIG. 2. Each leaf spring 406A-C, may include a plurality of slots 510 to receive additional bolts or other suitable fasteners.

As shown in FIG. 5, the top leaf spring 406A has a pair of fulcrums 504 placed at a distance 512 from bolts on the leaf spring. The center leaf springs 406B, each leaf with a pair of fulcrums 506 placed at a distance 514 from bolts 409 on the center leaf spring, may be held in reinforcement bars 408B and mounted to the middle of the cell stack 400 by tightening nuts on the bolts 409. Likewise, the bottom leaf spring 406C, with two fulcrums 508 positioned at a distance 516 from bolts 409 on the bottom leaf spring 406C, may be held inside reinforcement bar 408C and mounted to the bottom of the cell stack by tightening nuts on the bolts 409. The fulcrums 506 in the center leaf spring 406B may be placed closer to center 426 than fulcrums of the top and bottom leaf springs 406A and 406C, respectively.

The top, center and bottom leaf springs may be sized based on an expected cell stack loading profile. The type of loading profile and extent of deflection of each leaf spring may depend on magnitude of compression load at applied at the bolt and nut assembly, leaf spring geometry (i.e., shape, width and breadth of each leaf) and fulcrum distances along each leaf spring. In one example, top and bottom leaf springs may be selected to have similar compression loads and geometry, and the fulcrums in each leaf spring may be placed at similar distances. Due to similar compression loads, geometry and fulcrum positions, the resulting loading profiles in the top and bottom leaf springs may be similar. Likewise, compression loads, sizes of the center leaf springs 406B and fulcrum distances 514 of each center leaf may be selected to be similar, and may produce identical loading profiles. Alternatively, the top and bottom leaf springs may selected to have different compression loads, leaf spring sizes, and the fulcrums in each leaf may be placed at different distances. In this case, a loading profile in the top leaf spring 406A may differ from a load profile of the bottom leaf spring 406C. Likewise, different compression loads, leaf spring sizes and fulcrum distances of the center leaf springs 406B may be selected to produce different loading profiles on each center leaf spring.

By selecting different leaf spring sizes for the top, center and bottom leaf springs, and choosing fulcrum locations (in each leaf spring) based on a desired loading profile, deflection of the cell stack may be reduced to threshold levels while improving performance of the flow battery.

Referring to FIG. 6, an exploded view 600 of the second embodiment of the battery cell stack 400 is shown. The battery cell stack 400 is shown with the different components of the cell stack in an unassembled position. The reactor cells 402 may be wound around the cell housing 403 as shown in FIG. 6.

The cell stack may be assembled by mounting pressure plates 404 on an upstream face and downstream face of the cell housing 403. The upstream face of the cell housing may be on the first side 412 of the cell stack, and the downstream face may be on the second side 414 of the cell stack, for example. When mounted to the cell housing 403, a large portion of an inner surface 604 of the pressure plates 404 may be in face-sharing contact with the upstream and downstream faces of the cell housing 403. As an example, the pressure plates 404 may be secured to the cell housing 403 by a pressure force exerted by the plates. In other examples, the pressure plates 404 may be glued, welded or riveted to the cell housing 403. Next, the reinforcement bars 408A-C may be mounted to an outer surface 606 of the pressure plates 404 at the first side 412 and second side 414 of the cell stack. As an example, reinforcement bars 408A-C may be positioned at a first, a second and a third location at the first and second side of the cell stack 400. In this case, an inner face 608 of each reinforcement bar 408A-C may be in face-sharing contact with the outer surface 606 of the pressure plates 404. In one example, reinforcement bar 408A may be positioned at the first location, reinforcement bar 408B may be positioned at the second location, and reinforcement bar 408C may be positioned at the third location at the first side 412 and second side 414 of the cell stack 400. The reinforcement bars 408A-C may be secured to the pressure plates 404 using a pressure force between the bar and pressure plate, or using other suitable means such as glue, welding, rivets etc. The leaf springs 406A-C may be mounted inside reinforcement bars 408A-C, respectively on the first and second side of the cell stack. As an example, each leaf spring 406A-C may be mounted inside each reinforcement bar 408A-C on the first and second side of the cell stack, with each leaf spring 406A-C making face contact with an outer face 610 of each reinforcement bar 408A-C. In one example, each leaf spring 406A-C may be in face-sharing contact with each pair of fulcrums 504-508 when mounted inside the outer face 610 of each reinforcement bar 408A-C. When mounted inside the reinforcement bars 408A-C, slots 612 on each leaf spring 406A-C may be aligned with slots 614 (on each reinforcement bar 408A-C) and slots 620 on the pressure plates 404 along alignment axis 618.

Next, bolts 409 may be inserted through a washer 622, and extended through slots 612 on each leaf spring 406A-C, and through the slots 609 on each reinforcement bars 408A-C, on the second side 414 of the cell stack. In this case, the washer 622 on each bolt 409 may be in face-sharing contact with a first face 623 of each leaf spring 406A-C. The bolts 409 may be further extended along the cell stack to slots 620 on the pressure plate 404 on the first side 412 of the cell stack. In alternative examples, the bolts 409 may be further extended (through openings 416 on the cell stack) to the first side 412 of the cell stack. Subsequently, the bolts 409 may be extended through slots 614 of the reinforcement bars 408A-C on the first side 412 of the cell stack 400 along alignment axis 618. The bolts 409 may be further extended through each leaf spring 406A-C mounted inside each reinforcement bar 408A-C on the first side 412 of the cell stack 400. When extended further, a distal end 626 of each bolt 409 may protrude from a second face 624 of each leaf spring 406A-C on the first side 412 of the cell stack. Subsequently, a washer 622 and a nut 410 may be secured to the distal end 626 of each bolt 409 extended through each leaf spring 406A-C at the first side 412 of the cell stack. As an example, the washer 622 may be in face sharing contact with the second face 624 of each leaf spring 406A-C, when the washer 622 and nut 410 are secured to the distal end 626 of each bolt 409. In this way, the cell stack may be securely held together to keep deflection of the pressure plates 404 within allowable thresholds.

Figure 9:
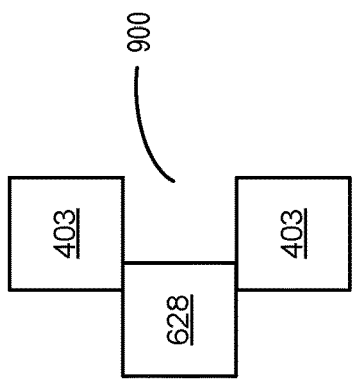
FIG. 9 shows an example housing aperture closed by a plug.

Next, the shaft 422 of each locking assembly 417 may be inserted into each opening 216 on the upstream face of the cell housing 403. Subsequently, each bushing 418 attached to the collar 420 of each locking assembly 417 may be coupled to the shaft 422 inserted in each opening 216 on the upstream face of the cell housing 403. As an example, a first pair of the locking assemblies 417 may be positioned at a first location on the cell housing 403, and a second pair of the locking assemblies 417 may be positioned at a second location on the cell housing. In this way, each set of locking assemblies may be used to close off or block each pair of openings 216 in the cell housing 403 of the cell stack. A plurality of plugs 628 may be inserted through apertures (see FIG. 9, aperture 900) on the downstream face of the cell housing 403 to close off or block the apertures on the cell housing.

Referring to FIG. 7, an example leaf spring 700 of the battery cell stacks 200 and 400 subjected to different loads, is shown. The loading on the example leaf spring 702 may represent loading behavior observed on a top, center and bottom leafs springs (e.g., leaf springs 206A-C, shown in FIGS. 2-3 or leaf springs 406A-C, shown in FIGS. 4A-5) secured to the cell stack using tie rod assemblies (such as tie rods 203 and 204, shown in FIGS. 2-3). Each leaf spring may be held in a reinforcement bar which may be secured to a pressure plate (e.g., pressure plate 207 shown in FIG. 2) mounted on the battery cell stack.

As shown in FIG. 7, leaf spring 702 may be compressively loaded at the edges with loads 704 and 706. As an example, the loads 704 and 706 imposed on the leaf spring 702 may be equal. In an alternative example, the loads 704 and 706 exerted on the leaf spring 702 may be unequal. A pair of fulcrums 708 and 710 may be placed underneath the leaf spring 702 at fulcrum distances 712 and 714 to redirect the compression force exerted by loads 704 and 706 along a section of the leaf spring in contact with the pressure plate compressing an active area of the battery cell stack. In one example, the fulcrum distances 712 and 714 along the leaf spring 702 may be equal, producing a first loading profile. In alternate examples, the fulcrum distances 712 and 714 along the leaf spring may be unequal, producing a second loading profile, different from the first loading profile.

A sectional view along plane 716 through leaf spring 702, shows dimensions of the leaf spring. The width and depth of the leaf spring 702 may be represented as b and d, respectively. The loading on the leaf spring 702 is directed through a neutral axis of the leaf spring located at a distance, $y_{na}$ from the base of the leaf. Under the applied loading, the leaf spring 702 may bend to produce deflection, y. The resulting deflection may be determined based on classical beam theory from equations below.

$$\sigma = \frac{-wa}{z} \quad \text{Eq. 1}$$

$$z = \frac{I}{y_{na}} \quad \text{Eq. 2}$$

$$I = \frac{bd^3}{12} \quad \text{Eq. 3}$$

$$y = \frac{wa}{6EI}[3a(l-a) - x^2] \quad \text{Eq. 4}$$

Stress imposed on the leaf spring 702 may be represented as σ, w is a load imposed on the leaf spring, a is a fulcrum distance, z is a vertical distance along the leaf spring x is a horizontal distance along the leaf spring where deflection is computed, l is a leaf spring length, I is the moment of inertia of the leaf spring and E is elastic modulus of a material comprising the leaf spring.

A summary of design variables and structural properties of an example leaf spring placed at the top, center and bottom of a battery cell stack are shown in Table 1. The example leaf springs may be manufactured using cold drawn steel 4142 with yield strength ($\sigma_y$), maximum stress ($\sigma_m$), elastic modulus (E) and each leaf spring has a safety factor (SF) as shown in Table 1. The safety factor of each leaf spring is calculated as a ratio of the yield strength to the maximum stress. In this example, the leaf springs used in the cell stack comprise of cold drawn steel. In other examples, the leaf springs may be comprised of other suitable materials such as cast iron, alloy steel, carbon steel, stainless steel, aluminum, aluminum alloy, thermoset polymer, thermoplastic polymer, and fiber reinforced polymer (FRP). In alternative examples, the leaf springs may be comprised of Monel, Inconel, beryllium copper alloy, phosphor bronze, etc.

TABLE 1

A summary of design variables and structural properties of example leaf springs placed at top, center and bottom of a battery cell stack.

| Variable | Value | Unit |
| --- | --- | --- |
| a | 45 (top/bottom leaf spring) 90 (center leaf spring) | mm |
| w | 1.88 (top/bottom leaf spring) 3.75 (center leaf spring) | KN |
| l | 360 (top/bottom leaf spring) 400 (center leaf spring) | mm |
| b | 19.05 (top/bottom leaf spring) 38.10 (center leaf spring) | mm |
| d | 9.53 (top/bottom leaf spring) | mm |

TABLE 1-continued

A summary of design variables and structural properties of example leaf springs placed at top, center and bottom of a battery cell stack.

| Variable | Value | Unit |
|---|---|---|
| $y_{na}$ | 12.7 (center leaf spring) 4.76 (top/bottom leaf spring) | mm |
| $\sigma_y$ | 6.35 (center leaf spring) 690 | MPa |
| $\sigma_m$ | 293 (top/bottom leaf spring) 303 (center leaf spring) | MPa |
| E | 20500 | MPa |
| SF | 2.4 (top/bottom leaf spring) 2.1 (center leaf spring) | dimensionless |

Referring to FIG. 8, an example graphical output 800 for example leaf springs placed at top, center and bottom positions of a battery cell stack of a flow battery is shown. The first graph represents a deflection 802 on leaf spring placed at top and bottom of the battery cell stack (such as leaf springs 206A and 206C shown in FIG. 3). The second graph represents deflection 804 of the leaf spring placed at the center of the battery cell stack (e.g., leaf spring 206B shown in FIG. 3). The deflection in the top, center and bottom leaf springs increases in the direction of the vertical axis. For both graphs, the horizontal axis represents a distance along the leaf springs where a deflection value is calculated. The distance along each leaf spring increases from the left side of each figure to the right side of each figure.

Referring to the first graph, the deflection (802) in the top and bottom leaf springs is shown to vary non-linearly. A large negative deflection, observed at the left edge of the leaf spring, coincides with a location of a first a tie rod assembly at point A. By tightening a nut on the tie rod assembly, a compression load may be applied on the leaf spring causing the leaf to deflect inward. The deflection may decrease as distance along each leaf increases, and reaches an inflection point at location B, where the deflection transitions from negative to positive. The minimum deflection on the leaf spring occurs at a first fulcrum position at point B (such as location of fulcrum load 708 shown in FIG. 7). The fulcrum is designed to redirect the compression load towards an active area of the cell stack while keeping deflection of the leaf within allowable limits. After transitioning through the fulcrum location, the deflection along the leaf increases in the positive direction and reaches a maximum deflection at point C. The maximum deflection occurs at the center (located at point C) of the leaf spring. Beyond point C, the deflection may decrease gradually and reach another point of minima (not shown) at a second fulcrum position (such as location of fulcrum load 710 shown in FIG. 7), where the deflection may transition from positive to negative. After transitioning through the second fulcrum position, the deflection may increase in the negative direction, reaching a large negative deflection value at the right end of the leaf spring where a second tie rod assembly is located.

Turning to the second graph, the deflection (804) in a center leaf spring is shown to vary non-linearly. A large negative deflection is observed at the left edge of the leaf spring. The large negative deflection coincides with a location of a first a tie rod assembly at point D. A compression load, provided by the tie rod assembly at point D, causes the leaf to deflect inward. The deflection may decrease along the leaf and reach an inflection location at point E. A minimum deflection along the leaf spring occurs at point E, a location of a first fulcrum (such as location of fulcrum load 708 shown in FIG. 7). Again, the fulcrum may be designed to redirect the compressive load towards an active area of the cell stack while keeping deflection in the leaf spring to allowable levels. At point E, the deflection transitions from negative to positive, and increases in the positive direction attaining a maximum deflection at point F. The maximum positive deflection in the leaf spring occurs midway along the leaf spring at point F. Beyond point F, the deflection may decrease gradually and reach another point of minima (not shown) at a second fulcrum position (such as location of fulcrum load 710 shown in FIG. 7), where the deflection may transition from positive to negative. After transitioning through the second fulcrum position, the deflection may increase in the negative direction and reach a large negative deflection value at the right end of the leaf spring where a second tie rod assembly may be located.

As illustrated in FIG. 8, the loading profile on leaf springs placed at the top and bottom of the cell stack may differ from the loading profile of a leaf spring attached at the center of the cell stack. The differences in loading profiles of the example leaf springs discussed above may be attributed to differences in compression load (applied at the tie rod assembly), leaf spring geometry (length, width and breadth), and fulcrum locations along each leaf. Considering the example leaf spring placed at the top, center and bottom of the cell stack discussed above. The maximum positive deflection (802) in the top and bottom leaf springs is shown to be larger than the maximum positive deflection (804) in the center leaf spring of the cell stack. Since the center leaf spring is wider and thicker compared to the top and bottom leaf springs, the center leaf spring is able to withstand a larger compressive load with minimal deflection. Further, the location of the fulcrums along each leaf spring affect the loading profile, as shown by deflection profile 802 of the top and bottom leaf springs and deflection profile 804 of the center leaf spring.

By selecting different sizes of leaf springs for the top, center and bottom leaf springs and choosing suitable fulcrum positions along each leaf spring, the cell stack compression system may reduce non-uniform loading of the cell stack while keeping deflections in the cell stack to threshold levels and improving performance of the flow battery.

In one example, a cell stack, comprising: a plurality of cells stacked together to form a flow battery; and a compression system comprising at least two tie rods extending through the plurality of cells clamping a spring acting at opposite ends to compress the cells together, the spring contacting at least two fulcrum elements positioned between the tie rods. In the preceding example additionally or optionally, the fulcrums are movable when the compression is released. In any or all of the preceding examples, additionally or optionally, the spring is a leaf spring comprising one or more leaf spring elements. In any or all of the preceding examples, additionally or optionally, the leaf spring element includes a planar rectangular bar having a length longer than a width longer than a thickness. In any or all of the preceding examples, additionally or optionally, the tie rods are threaded and tightened via rotation about their central longitudinal axis.

In the preceding examples, additionally or optionally, only a pair of fulcrums is mated with only a pair of tie rods, where a plurality of said pairs of rods and fulcrums compresses the stack. In any or all of the preceding examples, additionally or optionally, the fulcrums are positioned between an exterior wall formed by one or more of the plurality of cells and an interior wall of the spring. In any or all of the preceding examples, additionally or optionally, the fulcrums are selected to more evenly distribute load created by the spring across the stack in a direction of a length direction of the spring than if no fulcrums were provided. In any or all of the preceding examples, additionally or optionally, each cell is rectangular in shape and stacked with a shortest edge having a thickness and aligning with other edges of other cells to form a wall of the stack, the tie rods extended through the cells in a direction of the thickness. In any or all of the preceding examples, additionally or optionally, a plurality of singular springs and pairs of tie rods and pairs of fulcrums compress the cell stack, wherein the springs are planar and all lie in a common plane, and the tie rods are all aligned in parallel with each other.

Note that the example methods and systems included herein can be used with various flow battery system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used.

It will be appreciated that the configurations and routines disclosed herein are exemplary in nature, and that these specific embodiments are not to be considered in a limiting sense, because numerous variations are possible. For example, the above technology can be applied to a redox flow battery, hybrid flow battery system, and other flow battery types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A cell stack, comprising:
   a plurality of cells stacked together to form a flow battery; and
   a compression system comprising:
      pressure plates positioned on opposing ends of the plurality of cells;
      tie rods extending through the plurality of cells and the pressure plates;
      a spring acting on each pressure plate to compress the plurality of cells together;
      at least two fulcrum elements positioned between a respective spring and pressure plate and interior to the tie rods.

2. The cell stack of claim 1, further comprising one or more bars positioned between the respective spring and pressure plate and extending between a pair of tie rods;
   wherein the at least two fulcrum elements are positioned between a respective bar and spring and the least two fulcrum elements are movable when the compression is released.

3. The cell stack of claim 2, wherein the spring is a leaf spring comprising one or more leaf spring elements.

4. The cell stack of claim 3, wherein the one or more leaf spring elements include a planar rectangular bar having a length longer than a width longer than a thickness.

5. The cell stack of claim 1, wherein the tie rods are threaded and tightened via rotation about their central longitudinal axis.

6. The cell stack of claim 1, wherein only a pair of the at least two fulcrum elements is mated with only a pair of tie rods, where a plurality of the mated pairs of tie rods and fulcrums compresses the cell stack.

7. The cell stack of claim 1, wherein the at least two fulcrum elements are positioned between an exterior wall formed by one or more of the plurality of cells and an interior wall of the spring.

8. The cell stack of claim 1, wherein the at least two fulcrum elements are selected to more evenly distribute load created by the spring across the cell stack in a direction of a length direction of the spring than if no fulcrum elements were provided.

9. The cell stack of claim 1, wherein each cell is rectangular in shape and stacked with a shortest edge having a thickness and aligning with other edges of other cells to form a wall of the cell stack, the tie rods extended through the plurality of cells in a direction of the thickness.

10. The cell stack of claim 1, wherein a plurality of singular springs and pairs of the tie rods and pairs of the at least two fulcrum elements compress the cell stack, wherein the plurality of singular springs are planar and all lie in a common plane, and the tie rods are all aligned in parallel with each other.

11. A system, comprising:
   a flow battery having a plurality of cells in a cell housing stacked together;
   pressure plates on opposing ends of the plurality of cells;
   tie rods extending through the plurality of cells and the pressure plates, the tie rods extending in parallel with each other and clamping a spring acting at an end of the plurality of cells to compress the plurality of cells together; and
   the spring contacting at least two fulcrum elements positioned between the spring and a respective pressure plate and interior to the tie rods.

12. The system of claim 11, wherein the flow battery further includes plugs inserted through apertures on a face of the cell housing to block the apertures on the cell housing.

13. The system of claim 11, further comprising one or more bars positioned between the spring and the respective pressure plate and extending between a pair of tie rods; and
   wherein the at least two fulcrum elements are positioned between the one or more bars and the spring and the at least two fulcrum elements are movable when the compression is released; and
   wherein the spring is a leaf spring comprising one or more leaf spring elements.

14. The system of claim 13, wherein the one or more leaf spring elements include a planar rectangular bar having a length longer than a width longer than a thickness.

15. The system of claim 13, wherein the tie rods are threaded and tightened via rotation about their central longitudinal axis.

16. The system of claim 15, wherein only a pair of the at least two fulcrum elements is mated with only a pair of tie rods, where a plurality of the mated pairs of tie rods and the at least two fulcrum elements compresses the stacked plurality of cells.

17. The system of claim 16, wherein the at least two fulcrum elements are positioned between an exterior wall formed by one or more of the plurality of cells and an interior wall of the spring.

18. The system of claim 17, wherein each cell is rectangular in shape and stacked with a shortest edge having a thickness and aligning with other edges of other cells to form a wall of the stacked plurality of cells, the tie rods extended through the plurality of cells in a direction of the thickness.

19. The system of claim 18, wherein a plurality of singular springs and pairs of the tie rods and pairs of at least two fulcrum elements compress the stacked plurality of cells, wherein the plurality of singular springs are planar and all lie in a common plane, and the tie rods are all aligned in parallel with each other.

20. A system, comprising:
a flow battery having a plurality of cells in a cell housing stacked together; and
pressure plates on opposing ends of the plurality of cells;
tie rods extending through the plurality of cells and the pressure plates, the tie rods clamping a spring acting at an end to compress the plurality of cells together; and
the spring contacting at least two fulcrum elements positioned between the spring and a respective pressure plate and interior to the tie rods,
wherein the at least two fulcrum elements are movable when the compression is released,
wherein the spring is a leaf spring comprising one or more leaf spring elements,
wherein a plurality of singular springs and pairs of tie rods and pairs of at least two fulcrum elements compress the stacked plurality of cells,
wherein the plurality of singular springs are planar and all lie in a common plane, and the tie rods are all aligned in parallel with each other.

* * * * *